United States Patent
Sun

(10) Patent No.: US 8,898,362 B2
(45) Date of Patent: Nov. 25, 2014

(54) LANE JUMPER

(75) Inventor: Zheng-Heng Sun, New Taipei (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 507 days.

(21) Appl. No.: 13/224,305

(22) Filed: Sep. 1, 2011

(65) Prior Publication Data

US 2013/0024591 A1    Jan. 24, 2013

(30) Foreign Application Priority Data

Jul. 22, 2011    (CN) .......................... 2011 1 0206550

(51) Int. Cl.
*G06F 13/00* (2006.01)
*G06F 13/40* (2006.01)
*H05K 1/11* (2006.01)

(52) U.S. Cl.
CPC .................................. *G06F 13/4063* (2013.01)
USPC ............................ 710/300; 710/301; 361/792

(58) Field of Classification Search
CPC .................. H05K 7/1409; G06F 1/183–1/186; G06F 2213/0026
USPC .................................... 710/300–301; 361/792
See application file for complete search history.

(56) References Cited

U.S. PATENT DOCUMENTS

| | | | |
|---|---|---|---|
| 6,687,134 B2* | 2/2004 | Vinson et al. | 361/798 |
| 6,881,092 B2* | 4/2005 | Ke et al. | 439/483 |
| 7,246,190 B2* | 7/2007 | Nguyen et al. | 710/306 |
| 7,440,293 B2* | 10/2008 | Hood et al. | 361/810 |
| 7,447,825 B2* | 11/2008 | Chen | 710/307 |
| 7,539,801 B2* | 5/2009 | Xie et al. | 710/104 |
| 7,596,649 B2* | 9/2009 | Hsu et al. | 710/300 |
| 7,600,112 B2* | 10/2009 | Khatri et al. | 713/100 |
| 7,631,134 B2* | 12/2009 | Jian | 710/301 |
| 7,793,029 B1* | 9/2010 | Parson et al. | 710/306 |
| 8,433,839 B2* | 4/2013 | Sun | 710/301 |
| 8,484,399 B2* | 7/2013 | Berke et al. | 710/301 |
| 8,601,196 B2* | 12/2013 | Sun | 710/306 |

* cited by examiner

*Primary Examiner* — Brian Misiura
(74) *Attorney, Agent, or Firm* — Novak Druce Connolly Bove + Quigg LLP

(57) ABSTRACT

A lane jumper for transmitting at least one lane from a first interface to a second interface is disclosed. The at least one lane is connected with the first interface. The first interface defines a first pin group and a second pin group, and the second interface defines a third pin group connected with the second pin group. The lane jumper includes a fourth pin group and a fifth pin group, wherein the fourth pin group and the fifth pin group of the lane jumper are configured for being respectively connected with the first pin group and the second pin group. The at least one lane is transmitted from the first interface to the second interface sequentially through the first pin group, the fourth pin group, the fifth pin group, the second pin group, and the third pin group.

10 Claims, 12 Drawing Sheets

LANE JUMPER

BACKGROUND

1. Technical Field

The present disclosure relates to a lane jumper, and particularly, to a lane jumper for an electrical interface.

2. Description of Related Art

Motherboard slots, such as PCI-E (Peripheral Component Interconnect Express), are electrical interfaces used for data transmission between a computer and an expansion card, such as a graphics card. Lanes provided by a chipset on the motherboard are distributed to slots on the motherboard, however, the lane number of lanes is limited in accordance with the capability of the chipset, and the lanes distributed to a particular slot cannot be used by another slot even when the particular slot is not in use.

Therefore, what is needed is a lane jumper for redirecting lanes between different slots.

BRIEF DESCRIPTION OF THE DRAWINGS

The components in the drawings are not necessarily drawn to scale, the emphasis instead being placed upon clearly illustrating the principles of a lane jumper. Moreover, in the drawings, like reference numerals designate corresponding parts throughout the several views.

DETAILED DESCRIPTION

Figure 1:
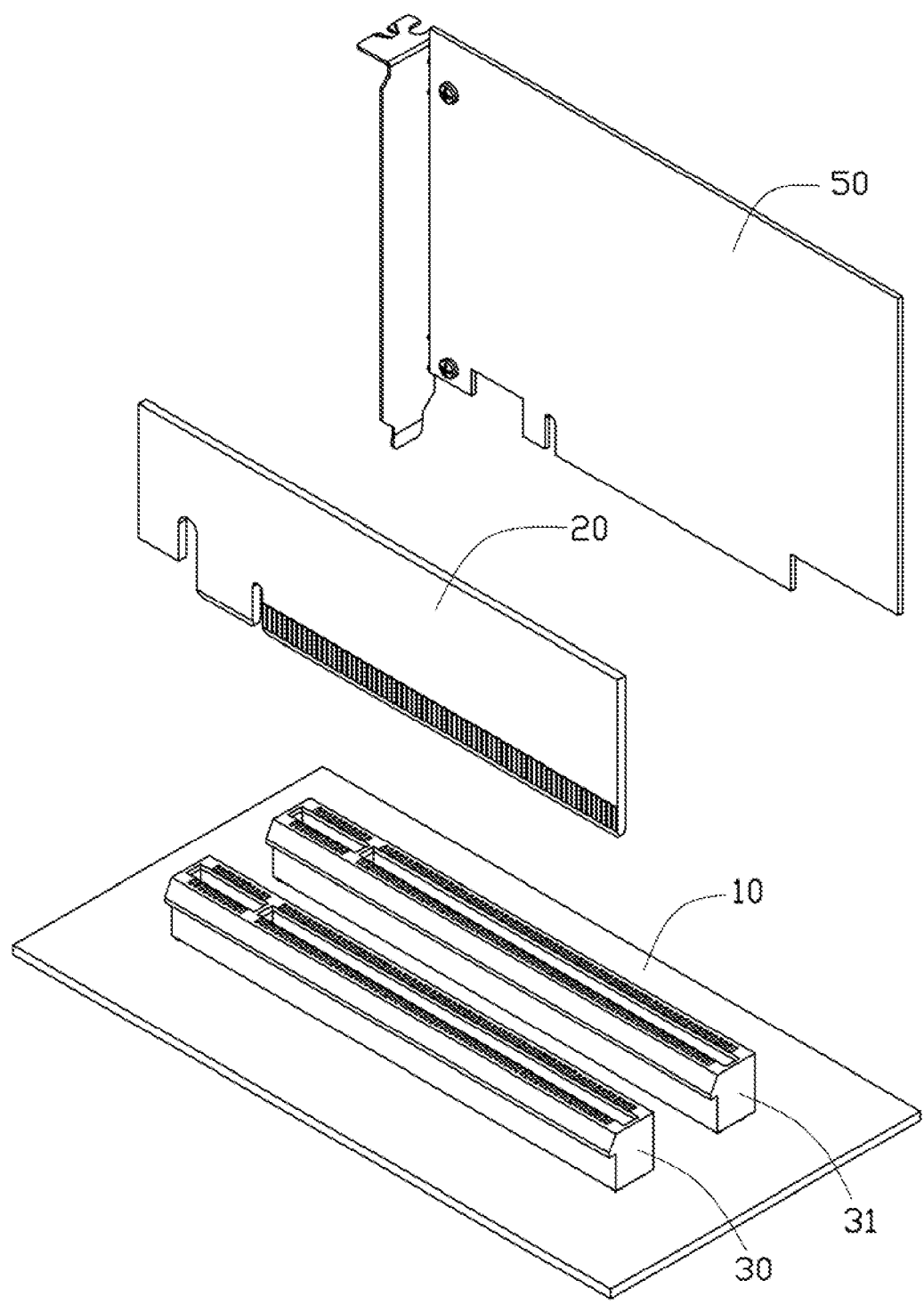
FIG. 1 is an exploded, isometric view of a mainboard, a first expansion card, and a first jumper board in accordance with an exemplary embodiment.

FIG. 1 shows an exemplary embodiment of the present disclosure, including a mainboard 10, a first jumper board 20, and a first expansion card 50. A first slot 30 and a second slot 31 are installed on the mainboard 10 and respectively correspond to the first jumper board 20 and the first expansion card 50. In the present embodiment, the first slot 30 and the second slot 31 are standard PCI-E x16 slots, and the first expansion card 50 is a PCI-E x16 add-on card.

Standard PCI-E slots can include up to 32 PCI-E lanes, termed x1, x4, x16, x32 in respect to the number of physical or electronic lanes, and each lane consists of 4 pins. In relation to the physical lanes of the slots, the electronic lanes are provided by a chipset on a motherboard. A standard PCI-E expansion card can fit into a standard PCI-E slot with more physical lanes, but can not be fitted into another standard PCI-E slot with less physical lanes, therefore, larger PCI-E slots are sometimes preferred for installation on the motherboard for receiving larger PCI-E expansion cards while the electronic lanes actually connected to the slot are less than the physical lanes of the slot. For example, when a motherboard capable of providing 20 PCI-E lanes is equipped with a PCI-E x4 slot, a PCI-E x8 slot, and a PCI-E x16 slot, the PCI-E x16 slot can only acquire 8 electronic lanes for data transmission while the PCI-E x4 slot and the PCI-E x8 slot are respectively set up with 4 and 8 electronic lanes, and thus limit the bandwidth of the PCI-E x16 slot.

The standard PCI-E slot includes a side A and a side B, having a number of pins respectively corresponding to the physical lanes. A standard PCI-E x1 slot has 18 pins on side A, called A1-A18, and 18 pins on side B, called B1-B18, and the first 13 pins on both side (A1-A13 and B1-B13) are for generic usage, such as power and clocking while the other 5 pins (A14-A18 and B14-B18) correspond to a lane called lane 0 for signal transmission. A standard PCI-E x4 slot has 15 more pins (on both sides), called A19-A32 and B19-B32, than the standard PCI-E x1 slot, and the 15 pins correspond to lanes 1 (A19-A22 and B19-B22), lane 2 (A23-A26 and B23-B26), and lane 3 (A27-A32 and B27-B32). A standard PCI-E x8 slot has 17 more pins (on both sides), called A33-A49 and B33-B49, than the standard PCI-E x4 slot, and the 17 pins correspond to lanes 4 (A33-A36 and B33-B36), lane 5 (A37-A40 and B37-B40), lane 6 (A41-A44 and B41-B44), and lane 7 (A45-A49 and B45-B49). A standard PCI-E x16 slot has 33 more pins (on both sides), called A50-A82 and B50-B82, than the standard PCI-E x8 slot, and the 33 pins correspond to lanes 8 (A50-A53 and B50-B53), lane 9 (A54-A57 and B54-B57), lane 10 (A58-A61 and B58-B61), lane 11 (A62-A65 and B62-B65), lanes 12 (A66-A69 and B66-B69), lane 13 (A70-A73 and B70-B73), lane 14 (A74-A77 and B74-B77), and lane 15 (A78-A82 and B78-B82).

Figure 2:
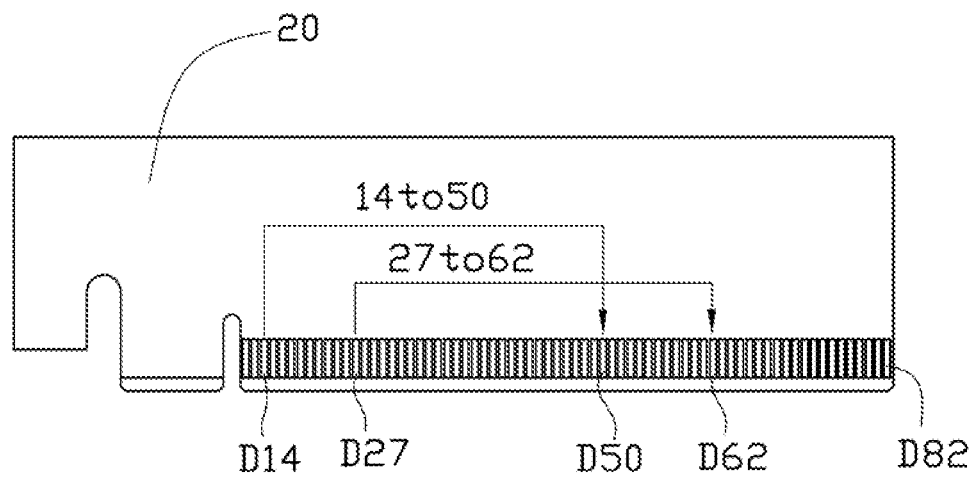
FIG. 2 is a side view of the first jumper board of FIG. 1.

The mainboard 10 has a chipset (not shown) capable of providing 16 electronic lanes. The first slot 30 and the second slot 31 allow only 8 electronic lanes from the chipset, and the first slot 30 and the second slot 31 can be used as PCI-E x8 slots only because the physical lanes A50-A82 and B50-B82 of the first slot 30 and the second slot 31 are unusable. In the PCI-E standard, the physical lanes 8-15 (A50-A82 and B50-B82) of the first slot 30 are respectively connected to the physical lanes 8-15 (A50-A82 and B50-B82) of the second slot 31, for example, A50 of the first slot 30 is connected to A50 of the second slot 31. The first jumper board 20 includes a side C and a side D. Referring to FIG. 2, each of the two sides of the first jumper board 20 has pins (C14-C82 and D14-D82) capable of being connected to physical lanes 0-15 (A14-A82 and B14-B82) when plugged into a standard PCI-E x16 slot. The pins of the first jumper board 20 can be divided into a first pin group, which includes C14-C49 and D14-D49, and a second pin group, which includes C50-C-82 and D50-D82. Each pin of the first pin group is respectively connected to a pin of the second pin group, for example, D14 is connected to D50, and D27 is connected to D62. The first jumper board 20 can therefore connect the physical lanes 0-7 of a standard PCI-E x16 slot to the physical lanes 8-15 of the standard PCI-E x16 slot, in a corresponding fashion. The connection relationships of the first jumper board 20 are listed below:

| From | To | From | To |
|------|-----|------|-----|
| D14 | D50 | C14 | C50 |
| D15 | D51 | C15 | C51 |
| D16 | D52 | C16 | C52 |
| D17 | X | C17 | C53 |
| D18 | D53 | C18 | C54 |
| D19 | D54 | C19 | X |
| D20 | D55 | C20 | C55 |
| D21 | D56 | C21 | C56 |
| D22 | D57 | C22 | C57 |
| D23 | D58 | C23 | C58 |
| D24 | D59 | C24 | C59 |
| D25 | D60 | C25 | C60 |
| D26 | D61 | C26 | C61 |
| D27 | D62 | C27 | C62 |
| D28 | D63 | C28 | C63 |
| D29 | D64 | C29 | C64 |
| D30 | X | C30 | C65 |
| D31 | X | C31 | C66 |
| D32 | D65 | C32 | X |
| D33 | D66 | C33 | X |
| D34 | D67 | C34 | C67 |
| D35 | D68 | C35 | C68 |
| D36 | D69 | C36 | C69 |
| D37 | D70 | C37 | C70 |
| D38 | D71 | C38 | C71 |
| D39 | D72 | C39 | C72 |
| D40 | D73 | C40 | C73 |
| D41 | D74 | C41 | C74 |
| D42 | D75 | C42 | C75 |
| D43 | D76 | C43 | C76 |
| D44 | D77 | C44 | C77 |
| D45 | D78 | C45 | C78 |
| D46 | D79 | C46 | C79 |
| D47 | D80 | C47 | C80 |
| D48 | D81 | C48 | C81 |
| D49 | D82 | C49 | C82 |

According to the PCI-E standard, D17, D30, D31, C19, C32, C33 do not perform signal transmission, and thus are not connected with any pin. In other embodiments, the first pin group and the second pin group can be connected in other way to connect the physical lanes 0-7 of a standard PCI-E x16 slot with the physical lanes 8-15 of the standard PCI-E x16 slot.

Figure 3:
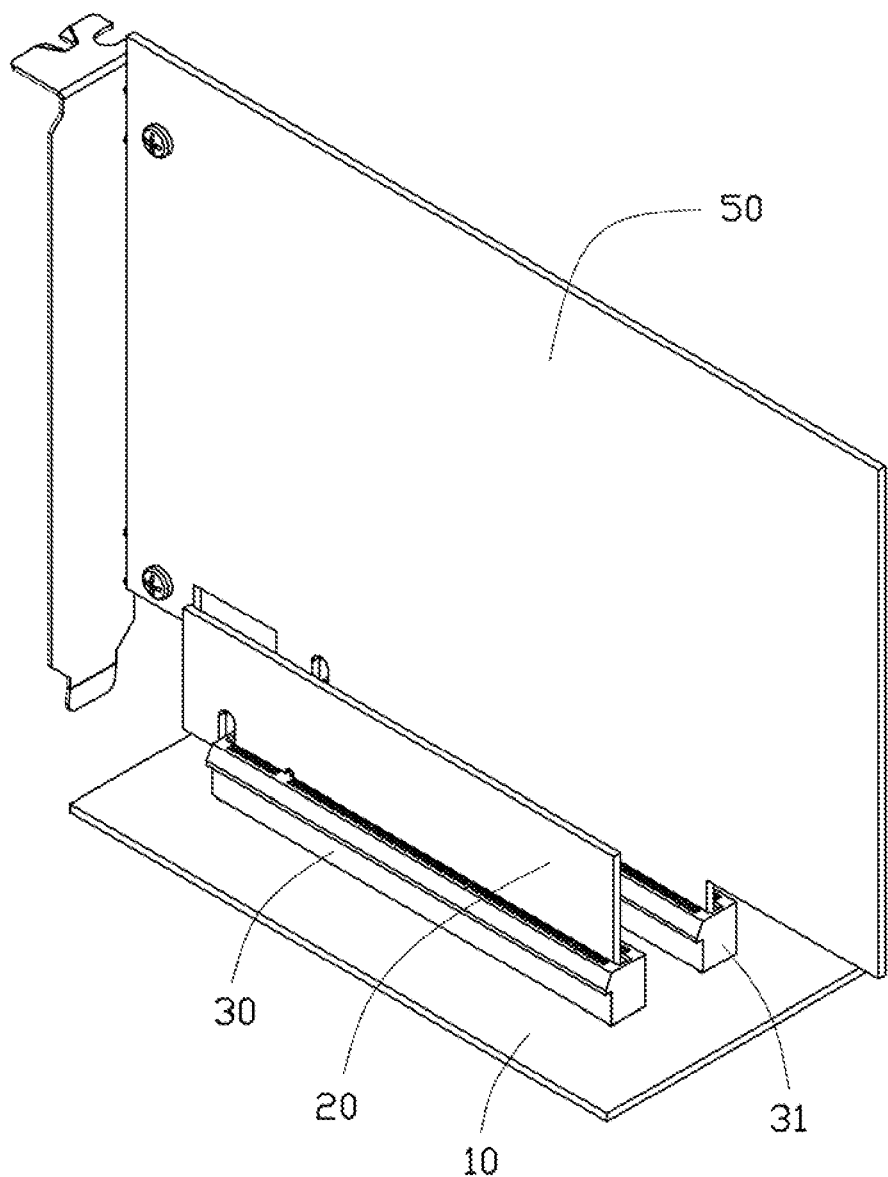
FIG. 3 is an isometric, assembled view of FIG. 1.

Referring to FIG. 3, when the first jumper board 20 and the first expansion card 50 are respectively plugged into the first slot 30 and the second slot 31, the first pin group (C14-C49 and D14-D49) and the second pin group (C50-C82 and D50-D82) of the first jumper board 20 are respectively connected to the lanes 0-7 (A14-A49 and B14-B49) and the lanes 8-15 (A50-A82 and B50-B82) of the first slot 30. The lanes 0-7 of the first slot 30 are connected to the lanes 8-15 of the first slot 30 sequentially through the first pin group and the second pin group of the first jumper board 20, and are further connected to the lanes 8-15 of the second slot 31 because the lanes 8-15 of the first slot 30 and the second slot 31 are connected. Therefore, the lanes 8-15 of the second slot 31 can be connected to the electronic lanes potentially available by virtue of the chipset of the mainboard 10 sequentially through the lanes 8-15 of the first slot 30, the second pin group and the first pin group of the first jumper board 20, and the lanes 0-7 of the first slot 30 to allow the first expansion card 50 to use 16 lanes rather than only 8 lanes from the chipset. In another embodiment, when the first expansion card 50 is plugged into the second slot 31, the jumper board can be plugged into the first slot 30 to achieve the same result.

Figure 4:
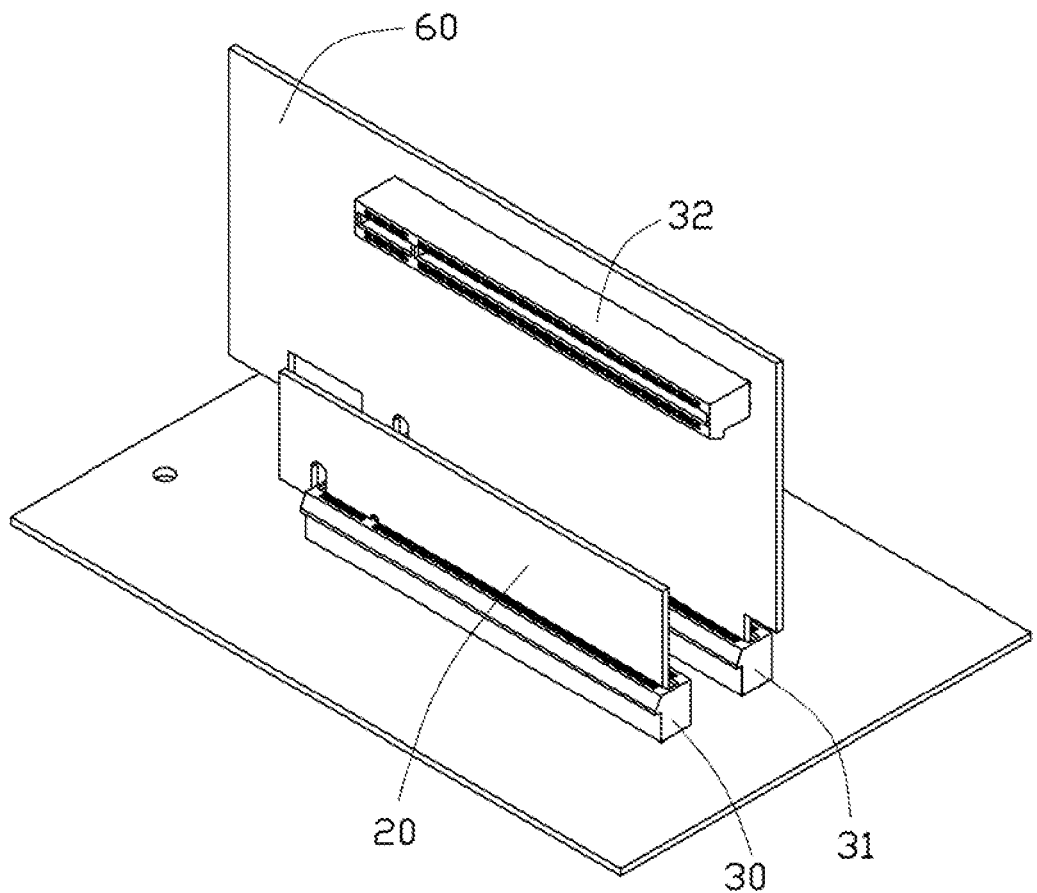
FIG. 4 is an isometric view of the mainboard, the first jumper board, and a first expansion board in accordance with another exemplary embodiment.

Referring to FIG. 4, in another embodiment, a first expansion board 60 is used to change the direction of the first expansion card 50 (not shown in FIG. 4) while a third slot 32 is installed on the first expansion board 60 to receive the first expansion card 50. The first jumper board 20 and a first expansion board 60 are respectively plugged into the first slot 30 and the second slot 31, and the first expansion card 50 can get 8 an additional PCI-E lanes from the chipset sequentially through the lanes 8-15 of the second slot 31, the lanes 8-15 of the first slot 30, the second pin group and the first pin group of the first jumper board 20, and the lanes 0-7 of the first slot 30. Therefore, when plugged into the third slot 32, the first expansion board 32 can use 16 electronic lanes in communication with the chipset. In the present embodiment, the first expansion card 50 is a PCI-E x16 riser card, and the third slot 32 is a PCI-E x16 slot.

Figure 5:
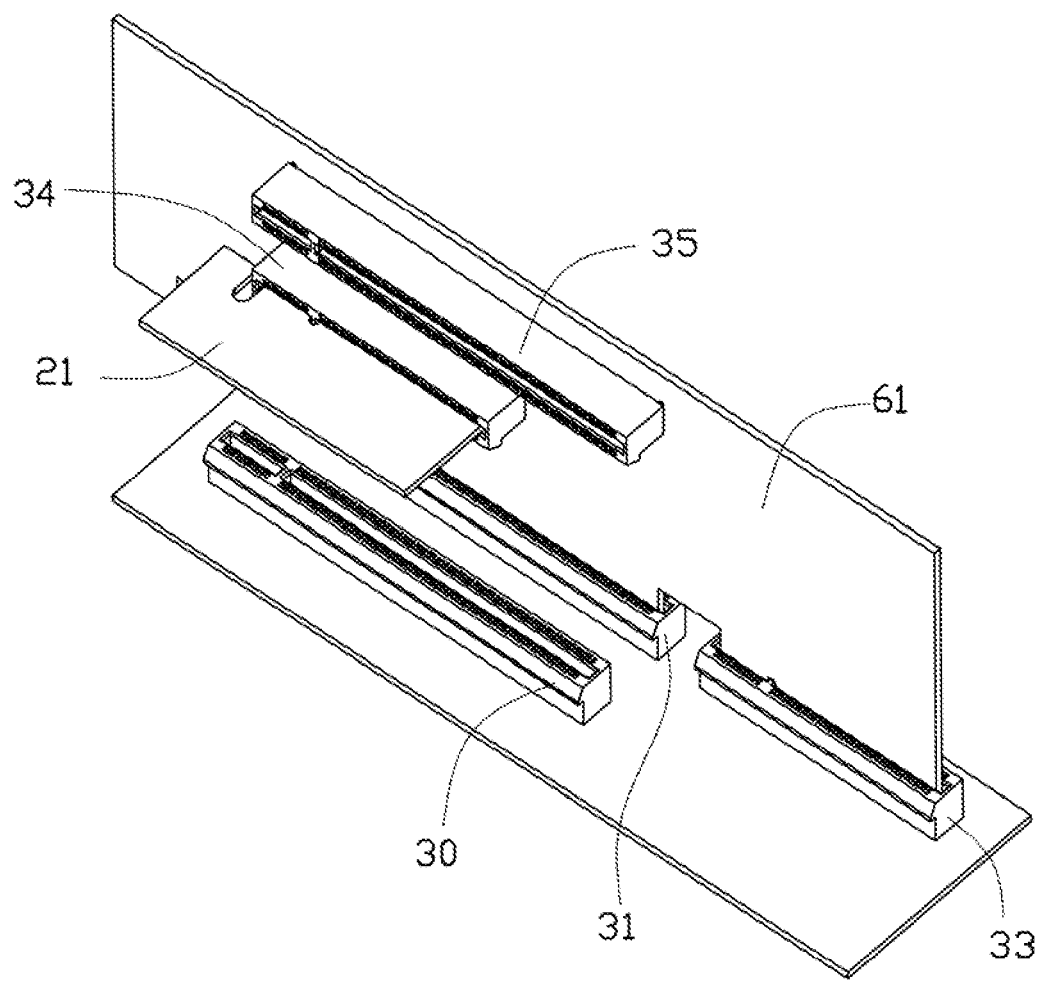
FIG. 5 is an isometric view of the mainboard, a second jumper board, and an second expansion board in accordance with another exemplary embodiment

FIG. 5 shows another embodiment of the present disclosure, which includes a second expansion board 61 and a second jumper board 21. The first slot 30, the second slot 31, and a fourth slot 33 are installed on the mainboard 10, and a fifth slot 34 and a sixth slot 35 are installed on the second expansion board 61. In the present embodiment, the fourth slot 33 and the fifth slot 34 are PCI-E x8 slots, and the sixth slot 35 is a PCI-E x16 slot. The second expansion board 61 is plugged into the second slot 31 and the fourth slot 33 to take the benefit of 16 electronic lanes from the chipset, that is, 8 through the second slot 31 and 8 through the fourth slot 33, and the fifth slot 34 and the sixth slot 35 both offer 8 PCI-E lanes. In the present embodiment, the second jumper board 21 can be plugged into the fifth slot 34 to allow the sixth slot 35 to connect to 4 more lanes from the fifth slot 34.

Figure 6:
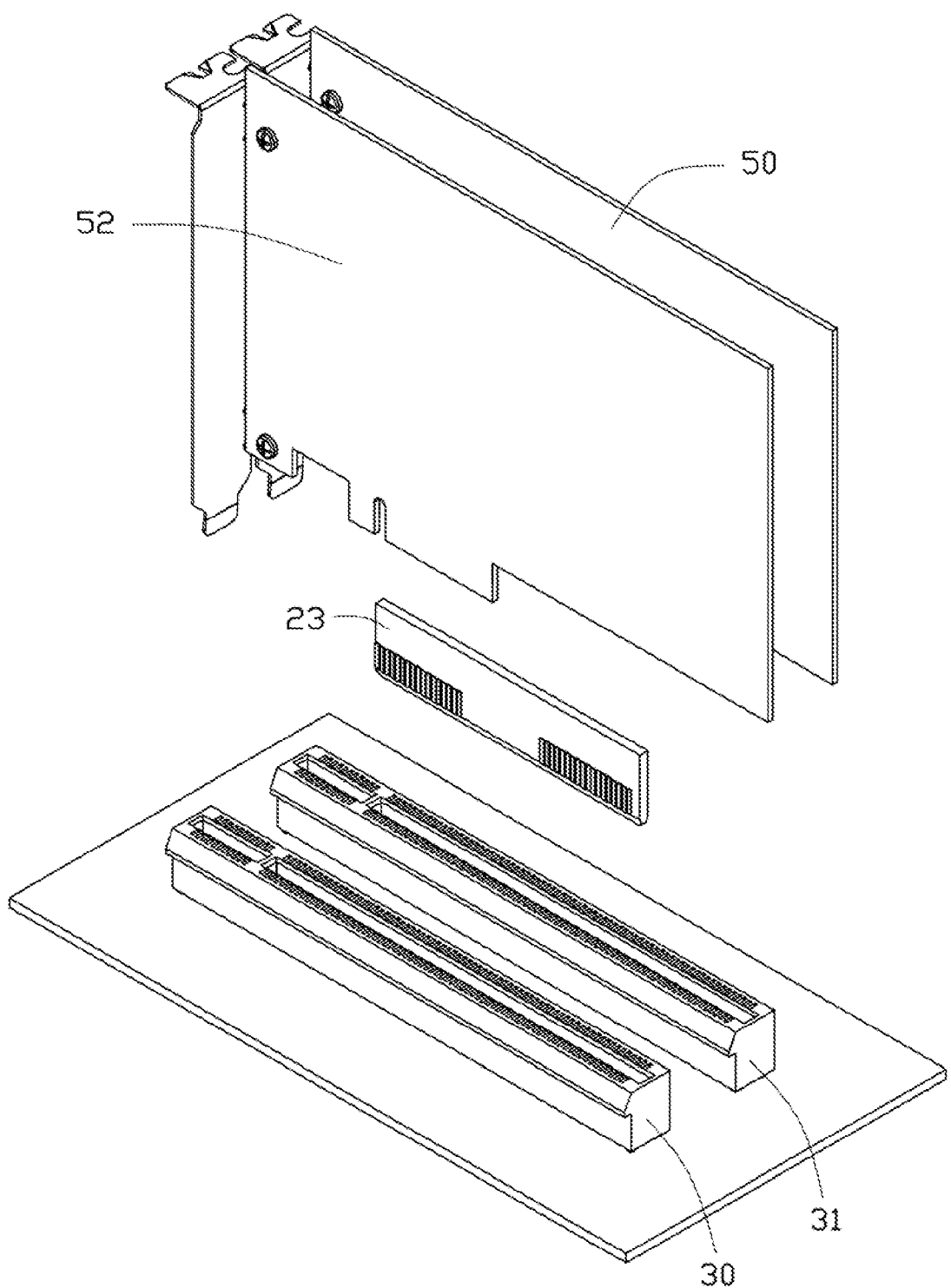
FIG. 6 is an exploded, isometric view of the mainboard, the first expansion card, a second expansion card, and a third jumper board in accordance with another exemplary embodiment.

FIG. 6 shows another embodiment of the present disclosure, including the first slot 30, the second slot 31, the first expansion card 50, a second expansion card 52, and a third jumper board 23. In the present embodiment, the second expansion card 52 is a PCI-E x4 add-on card. The third jumper board 23 and the second expansion card 52 can be simultaneously plugged into the first slot 30, and respectively correspond to the lanes 0-3 and the lanes 4-15 of the first slot 30.

Figure 7:
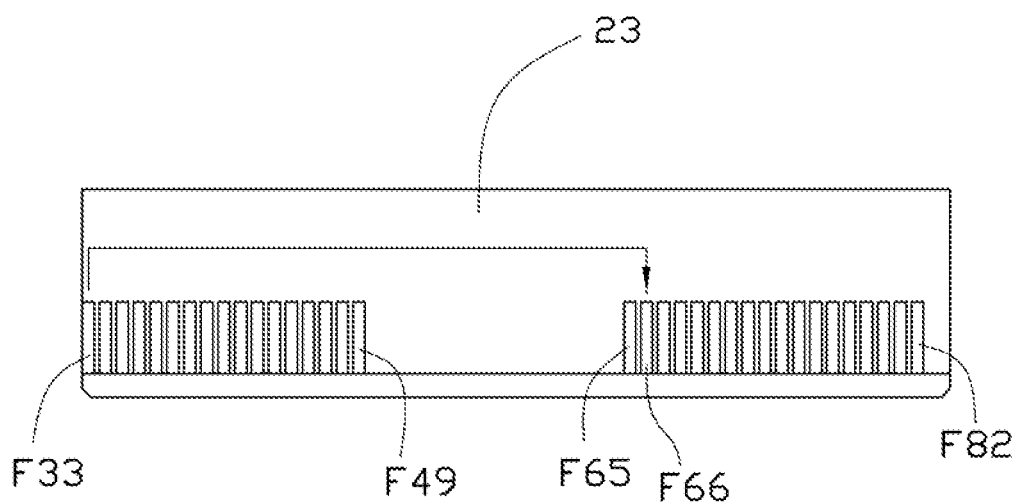
FIG. 7 is a side view of the third jumper board of FIG. 6.
Figure 8:
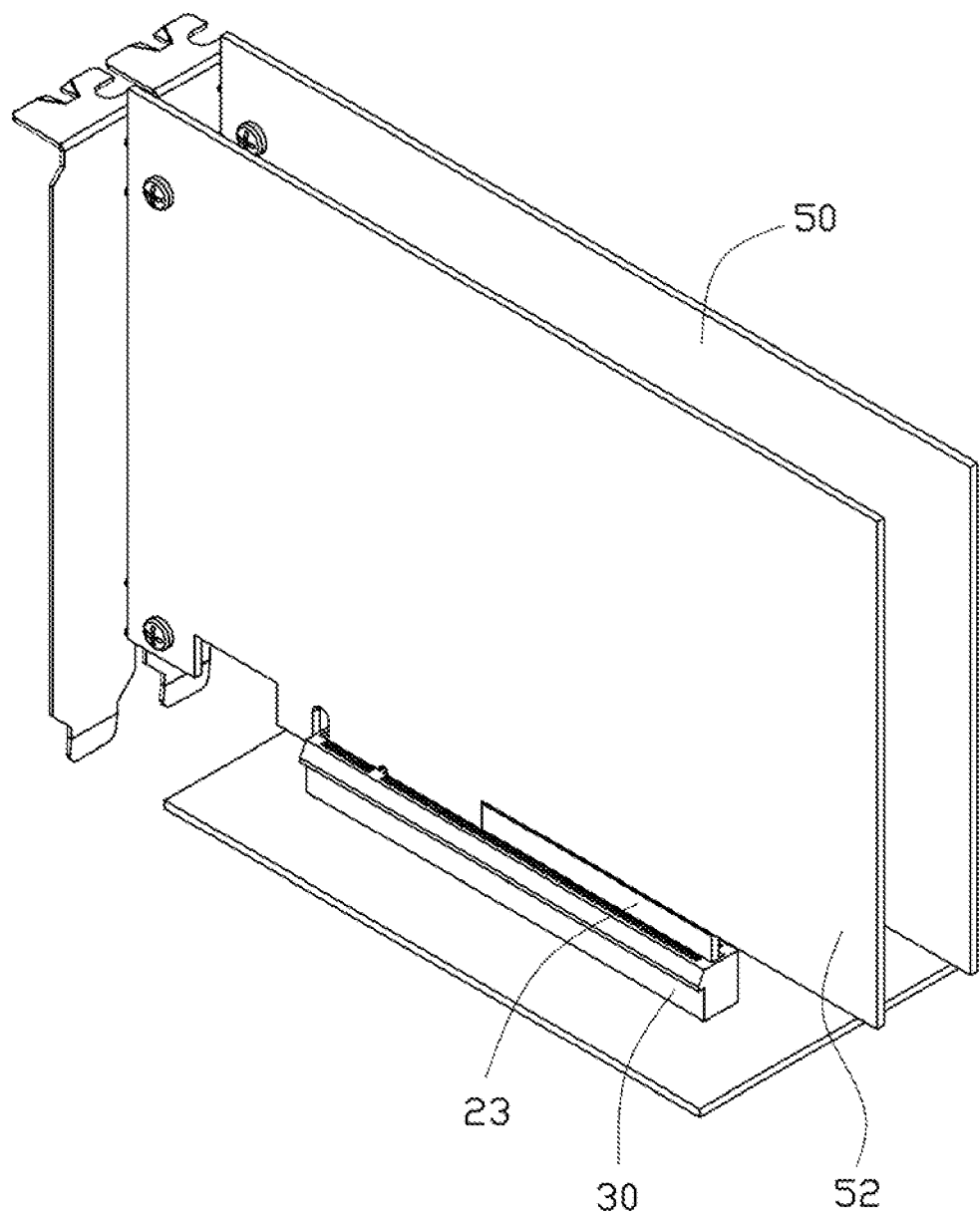
FIG. 8 is an isometric, assembled view of FIG. 6.

Referring to FIGS. 7-8, the third jumper board 23 has a third pin group (E33-E49 and F33-F49) and a fourth pin group (E66-E82 and F66-F82), which correspond to the lanes 4-7 and the lanes 12-15 of the first slot 30. The third pin group is connected to the fourth pin group to connect the lanes 4-7 of the first slot 30 to the lanes 12-15 of the first slot 30. For example, F33 is connected to F66. The connections relationship of the first jumper board 20 is listed below:

| From | To | From | To |
|------|-----|------|-----|
| F33 | F66 | E33 | F65 |
| F34 | F67 | E34 | E67 |
| F35 | F68 | E35 | E68 |
| F36 | F69 | E36 | E69 |
| F37 | F70 | E37 | E70 |
| F38 | F71 | E38 | E71 |
| F39 | F72 | E39 | E72 |
| F40 | F73 | E40 | E73 |
| F41 | F74 | E41 | E74 |
| F42 | F75 | E42 | E75 |
| F43 | F76 | E43 | E76 |
| F44 | F77 | E44 | E77 |
| F45 | F78 | E45 | E78 |
| F46 | F79 | E46 | E79 |
| F47 | F80 | E47 | E80 |
| F48 | F81 | E48 | E81 |
| F49 | F82 | E49 | E82 |

The lanes 12-15 of the second slot 31 can be connected to the chipset of the mainboard 10 sequentially through the lane 12-15 of the first slot 30, the fourth pin group of the third jumper board 23, the third pin group of the third jumper board 23, and the lanes 4-7 of the first slot 30 to allow the first expansion card 50 to use an additional four electronic lanes from the chipset while the first expansion card 50 and the second expansion card 52 are respectively plugged into the second slot 31 and the first slot 30.

In the PCI-E standard, each lane of the PCI-E slot is surrounded by ground pins to ensure signal quality. However the ground pin B32 which is adjacent to the lane 4 of the first slot 30 is occupied by the second expansion card 52 and the lane 4 of the third jumper board 23 is left unprotected. In the present embodiment, a reserved pin E33 surrounding the lane 4 of the third jumper board 23 is connected to another ground pin F65 to ensure the lane 4 is surrounded by ground pins. In another embodiment, other usable pins can be connected to other ground pin to ensure the signal quality of each of the lanes.

Figure 9:
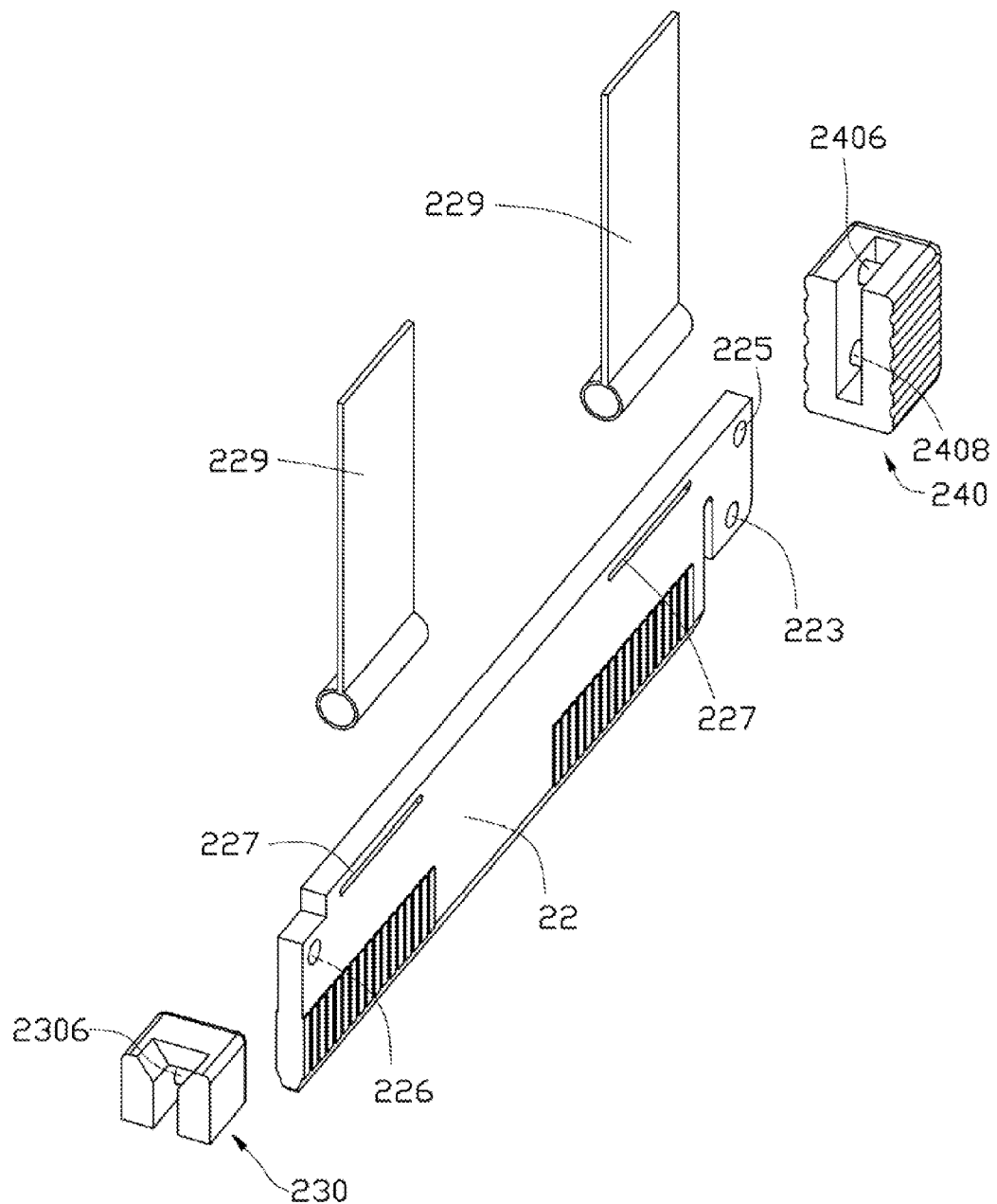
FIG. 9 is an exploded, isometric view of a fourth jumper board in accordance with another exemplary embodiment.
Figure 10:
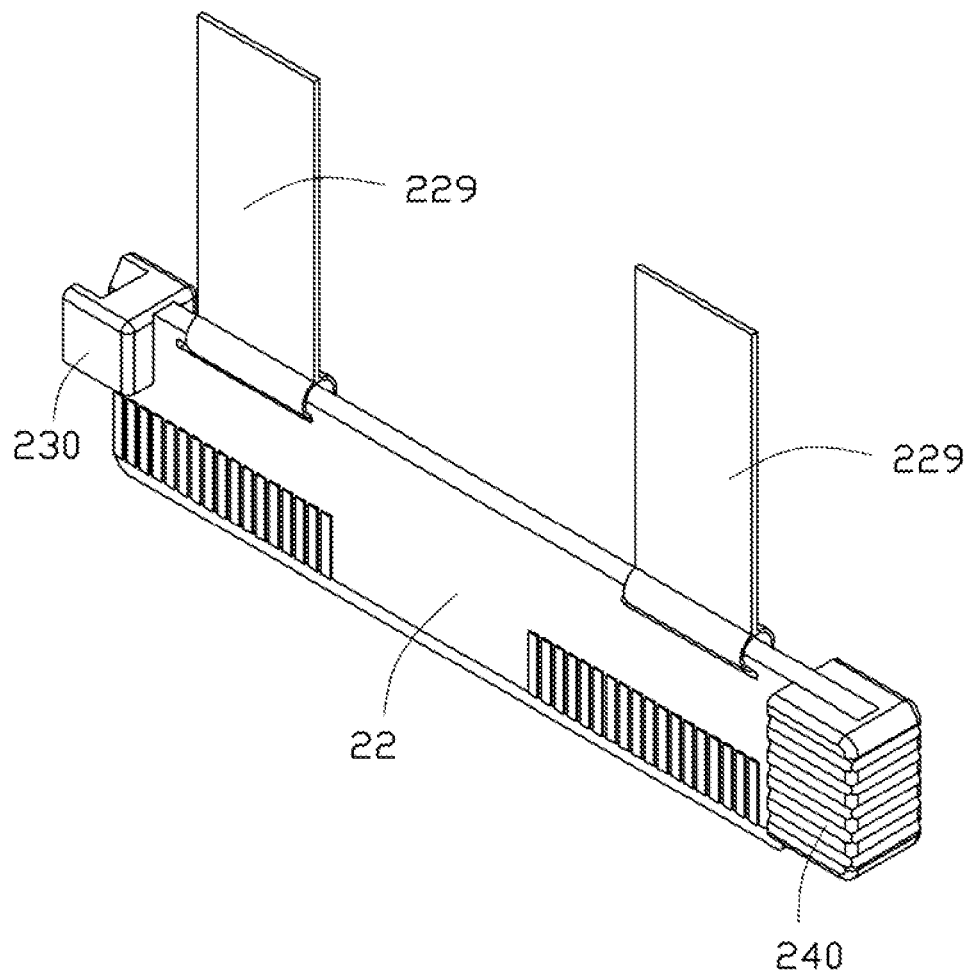
FIG. 10 is an assembled view of a fourth jumper board of FIG. 9.
Figure 11:
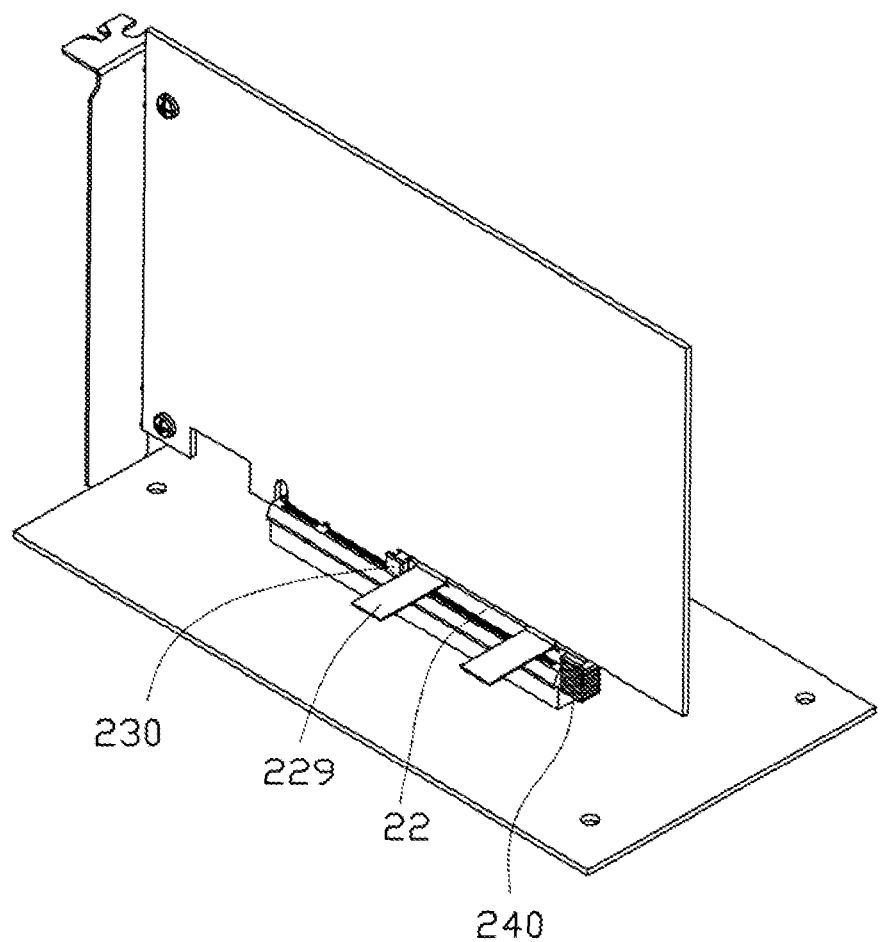
FIG. 11 is an isometric, assembled view of the fourth jumper board in operation.

Referring to FIGS. 9-11, a fourth jumper board 22 defines two ditches 227 thereon, and each ditch 227 corresponds to a jumper holder 229. The jumper holder 229 can be a thin sheet of plastic with one end penetrating through the ditch 227 and adhering to the other end of itself, and pulling the holder 229 can enable the easy removal of the fourth jumper board 22. The fourth jumper board 22 further defines a first hole 226 on one end, and a second hole 225 and a third hole 223 on the other end. A first block 230 having a first pin 2306 can be mounted to the fourth jumper board 22 by mounting the first pin 2306 in the first hole 226 of the fourth jumper board 22. A trough is defined on the first block 230 to accommodate the insertion of an expansion card when the fourth jumper board 22 and the expansion card are simultaneously plugged into the same slot. A second pin 2406 and a third pin 2408 of a second block 240 can be used to mount the second block 240 to the other end of the fourth jumper board 22 utilizing the second hole 225 and the third hole 223 of the fourth jumper board 22. The presence of the second block 240 prevents the incorrect insertion of the fourth jumper board 22. The attachment of first block 230 and the second block 240 provide assistance in pulling out the fourth jumper board 22 from the slot.

Figure 12:
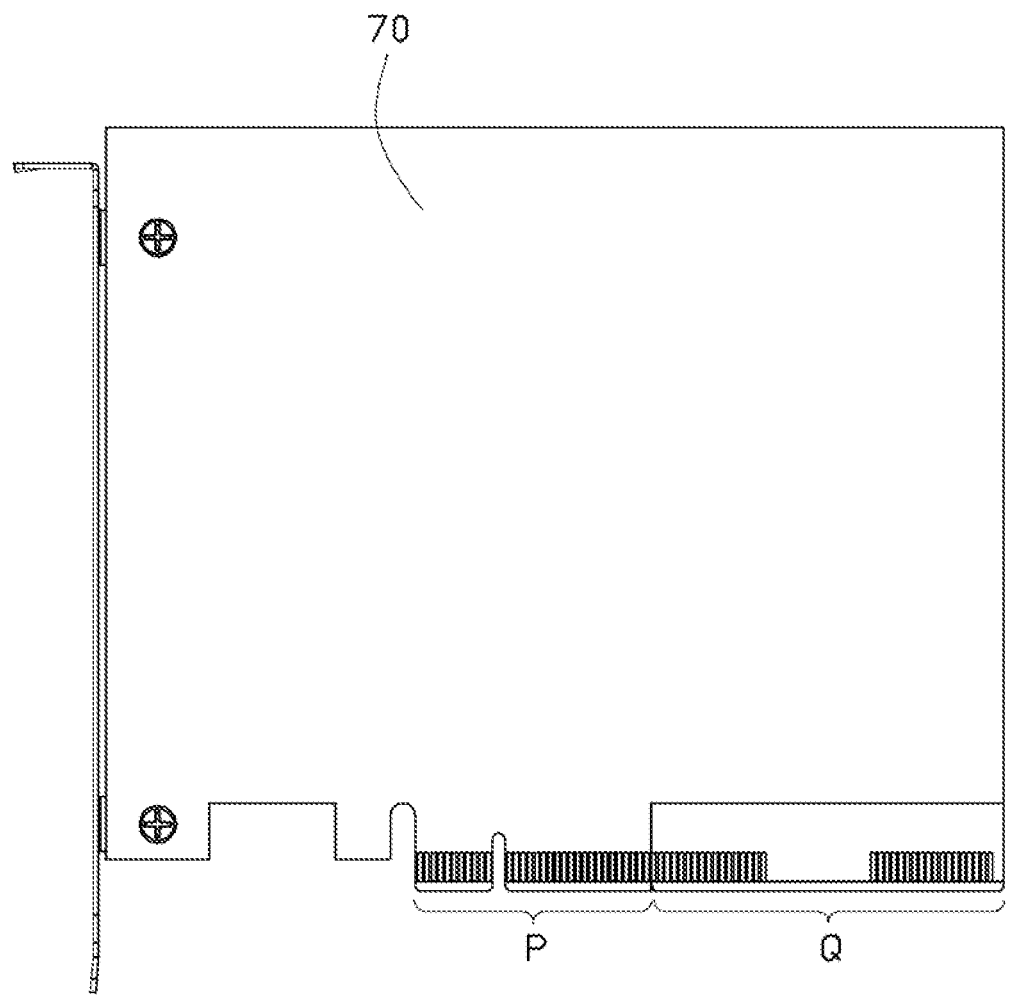
FIG. 12 is a jumper card in accordance with an exemplary embodiment.

Referring to FIG. 12, in another embodiment, the second expansion card 52 and the third jumper board 23 in FIG. 8 can be integrated into a jumper card 70. The pins on the jumper card 70 are divided into a P group for signal transmission and a Q group for lane transmission.

Although the present disclosure has been specifically described on the basis of this exemplary embodiment, the disclosure is not to be construed as being limited thereto. Various changes or modifications may be made to the embodiment without departing from the scope and spirit of the disclosure.

What is claimed is:

1. A lane jumper for transmitting at least one lane from a first interface to a second interface, wherein the at least one lane is connected with the first interface, the first interface defines a first pin group and a second pin group, and the second interface defines a third pin group connected with the second pin group, the lane jumper comprising:
   a fourth pin group and a fifth pin group, wherein the fourth pin group and the fifth pin group of the lane jumper are configured for being respectively connected with the first pin group and the second pin group; the at least one lane is transmitted from the first interface to the second interface sequentially through the first pin group, the fourth pin group, the fifth pin group, the second pin group, and the third pin group;
   wherein the first interface comprises a sixth pin group capable of connecting an expansion card, and the first interface is capable of being simultaneously connected with the expansion card and the lane jumper.

2. The lane jumper as claimed in claim 1, wherein the first pin group and the second pin group define a plurality of first pin subgroups and a plurality of second pin subgroups, and the at least one lane is a plurality of lanes; each of the plurality of lanes corresponds to one of the plurality of first pin subgroups and one of the plurality of second pin subgroups, respectively.

3. The lane jumper as claimed in claim 1, wherein a holder is fixed to the lane jumper and is operable to pull the lane jumper away from the first interface when removing the lane jumper from the first interface.

4. The lane jumper as claimed in claim 3, wherein the holder is a sheet of plastic penetrating a ditch on the lane jumper to fix to the lane jumper.

5. The lane jumper as claimed in claim 1, wherein a first block engages to one end of the lane jumper; the first block is capable of abutting the first interface and preventing the lane jumper from connecting the first interface in a wrong direction.

6. The lane jumper as claimed in claim 5, wherein a second block engages to the other end of the lane jumper; the second block defines a trough to allow an expansion card to pass when the expansion card and lane jumper are simultaneously connected to the first interface.

7. The lane jumper as claimed in claim 1, being mounted to the expansion card.

8. The lane jumper as claimed in claim 1, wherein the first interface and the second interface are Peripheral Component Interconnect Express (PCI-E) slots arranged on a mainboard, and the jumper card is plugged into the PCI-E slot.

9. The lane jumper as claimed in claim 1, wherein the first interface and the second interface are PCI-E slots arranged on an expansion board, and the jumper card is plugged into the PCI-E slot.

10. A lane jumper for transmitting at least one lane from a first interface to a second interface, wherein the at least one lane is connected with the first interface, the first interface defines a first pin group and a second pin group, and the second interface defines a third pin group connected with the second pin group, the lane jumper comprising:
    a fourth pin group and a fifth pin group, wherein the fourth pin group and the fifth pin group of the lane jumper are configured for being respectively connected with the first pin group and the second pin group; the at least one lane is transmitted from the first interface to the second interface sequentially through the first pin group, the fourth pin group, the fifth pin group, the second pin group, and the third pin group;
    wherein a first block engages to one end of the lane jumper; the first block is capable of abutting the first interface and preventing the lane jumper from connecting the first interface in a wrong direction; and
    wherein a second block engages to the other end of the lane jumper; the second block defines a trough to allow an expansion card to pass when the expansion card and lane jumper are simultaneously connected to the first interface.

* * * * *